UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT AND VARNISH REMOVER.

1,146,854.     Specification of Letters Patent.     Patented July 20, 1915.

No Drawing.     Application filed November 13, 1906. Serial No. 343,704.

*To all whom it may concern:*

Be it known that I, CARLETON ELLIS, a citizen of the United States, and resident of White Plains, in the county of Westchester, State of New York, have invented certain new and useful Improvements in Paint and Varnish Removers, of which the following is a specification.

This invention relates to paint and varnish removers and relates especially to removers comprising derivatives, such as the esters or ethers of the polyatomic alcohols of either the fatty or aromatic series, such removers being especially useful in removing varnish coatings in which shellac, sandarac or similar varnish resins or gums are employed.

Many of the derivatives of the polyatomic alcohols, which of course comprise all those having more than one hydroxyl group, are bodies possessing good solvent properties for varnish resins, those which are most active being thinly fluid and fairly volatile at ordinary temperatures. For example, certain derivatives of the diatomic alcohol glycol, such, for instance, as ethylene-di-ethyl ether, which is a pleasantly ethereal smelling liquid, boiling at 123 degrees C. having useful solvent properties. Better, however, than the ethyl-alcohol is the product of the chlorination of ethylene or the product formed by the treatment of glycol with hydrochloric acid. The chlorination products formed by either of these methods are powerful solvents for certain of the hard varnish gums.

Glycerin or glycerol in itself has no appreciable solvent action on varnish gums, but many of its derivatives are exceedingly active solvents. The body called acetin formed by the combination of glycerol and acetic acid is a good solvent. The halogen derivatives of glycerol afford solvents of very striking properties, particularly the chlorinated compounds, as, for instance, dichlorhydrin and epichlorhydrin. Dichlorhydrin occurs in two isomeric forms; alpha dichlorhydrin containing two chlorin atoms in the end radicals of the glycerol chain and having a boiling point of 175 degrees C. and the beta dichlorhydrin containing one chlorin atom in the end radicle and one chlorin atom in the middle radicle of the glycerol chain, having a boiling point of 182 degrees. Both of these bodies have a faint ethereal smell and are powerful solvents for all varnish gums and resins. Another chlorin derivative of glycerol is epichlorhydrin which has even stronger solvent properties than dichlorhydrins. It has a boiling point of 116 degrees C. These hydrins are commonly made by the action of anhydrous hydrochloric acid on concentrated glycerin. In this treatment chlorination, or more properly speaking, esterification goes on in different ways, producing chlorinated glycerol which is not a definite chemical substance, but a mixture of the various chlorinated hydrins above mentioned, and like most composite solvents it is therefore a very desirable varnish solvent. Another illustrative solvent of this character is dichloracetal which is formed by the action of chlorin upon alcohol and acetal. It is an aromatic smelling liquid, boiling at 183 degrees. The similar bromin compound is a heavier liquid boiling at 170 degrees, the bromin compounds being generally less valuable as solvents, although this dibromacetal, like dibromhydrin, has some considerable value as a solvent and both may be used in compounding removers of this character. It is, of course, understood that other acid radicles can be substituted for those mentioned in these compounds, securing the corresponding esters and producing in many cases liquid solvent bodies of analogous character.

It is, of course, preferable to have these removers compounded with some thickening body or stiffening material so as to insure their proper consistency and also to prevent undue evaporation under service conditions. It is, therefore, preferable in the case of those thinly liquid bodies, such as the dichlorhydrins, epichlorhydrin and the chlorinated glycerol referred to to assist in giving these bodies a suitable consistency and thickness to use stiffeners, such as starch, whiting, ground peat, infusorial earth, and wood flour. A suitable preparation of wax or other film-forming agent is also preferably incorporated to retard the evaporation of the more volatile ingredients.

An illustrative formula suitable for use under commercial conditions is chlorinated glycerol 100 parts, wood flour 25 parts. Another illustrative composition suitable for extreme service conditions consists of dichlorhydrin 100 parts; light infusorial earth 10 parts, and wax 5 parts. Paraffin or ceresin wax is preferable in this mixture and the wax may be incorporated with the dichlorhydrin by warming the latter until the wax dissolves. The wood flour and the infusorial earth should then be added while the mixture is stirred and allowed to cool, when the composition has a very considerable consistency. By varying the proportions of the wax and infusorial earth any desired degree of consistency may be secured. It will be observed that the solvents mentioned mainly have boiling points between 100 and 200 degrees C. and in incorporating into these mixtures cheap solvents it is preferably to select those which have boiling points approximating those of the esters principally relied upon. Light kerosene, mesitylene, cumene and the like, may be incorporated in either of the illustrative formulas mentioned in various proportions so as to exert the desired modifying or tempering influence on the chlorinated solvent employed which may be desirable in some cases to afford greater uniformity of action, or where the full strength of the chlorinated solvent is not necessary.

Another illustrative formula of a remover compounded along these lines which is useful on cheap resin varnish is chlorinated glycerol, 35 parts; cumene, 25 parts; light kerosene, 40 parts; with which may be incorporated as previously described, wood flour, or starch, 20 parts; ceresin wax, 10 parts.

This invention has been described in connection with a number of illustrative ingredients, formulas, proportions and processes, to the details of which disclosure the invention is not, of course, to be limited.

What is claimed is:—

1. The remover for paint or varnish comprising approximately chlorinated glycerol 35 parts, cumene 25 parts, light kerosene 40 parts, wood flour 20 parts and ceresin wax 10 parts.

2. The remover for paint or varnish comprising approximately chlorinated glycerol 35 parts, tempered with cumene 25 parts light petroleum hydrocarbon 40 parts with which waxy stiffening material has been incorporated.

3. The remover for paint or varnish comprising approximately chlorinated glycerol 35 parts, aromatic wax solvent material 25 parts, petroleum hydrocarbon material 40 parts and 30 parts of stiffening material including wax.

4. The remover for paint or varnish comprising chlorinated glycerol, penetrating hydrocarbon solvent material including an aromatic hydrocarbon and inert stiffening material including ceresin wax.

5. The remover for paint or varnish comprising chlorinated glycerol, penetrating hydrocarbon solvent material miscible therewith and incorporated stiffening material including wax.

6. The remover for paint or varnish comprising approximately chlorinated glycerol 35 parts, incorporated finish solvent material including an aromatic solvent 65 parts and stiffening material.

7. The remover for paint or varnish comprising dichlorhydrin miscible finish solvent material including an aromatic solvent and incorporated waxy stiffening material.

8. The remover for paint or varnish comprising a solvent halogen glycerol ester, wax dissolving finish solvent material and incorporated stiffening material including wax.

CARLETON ELLIS.

Witnesses:
HARRY L. DUNCAN,
JESSIE B. KAY.